United States Patent [19]

King

[11] Patent Number: 4,625,842

[45] Date of Patent: Dec. 2, 1986

[54] U-PATTERN HYDROSTATIC TRANSMISSION CONTROL LINKAGE

[75] Inventor: Michael J. King, Dubuque, Iowa

[73] Assignee: Deere & Company, Moline, Ill.

[21] Appl. No.: 740,931

[22] Filed: Jun. 3, 1985

[51] Int. Cl.$^4$ .................... B60K 41/26; G05G 9/12
[52] U.S. Cl. .................................. 192/4 C; 74/473 R
[58] Field of Search ............. 74/473 R; 192/4 A, 4 C

[56] References Cited

U.S. PATENT DOCUMENTS

| | | | |
|---|---|---|---|
| 3,470,771 | 10/1969 | Houk | 74/473 R X |
| 3,645,368 | 2/1972 | Blaauw | 192/4 C |
| 3,795,157 | 3/1977 | Campbell et al. | 74/473 R X |
| 4,048,869 | 9/1977 | Johnson | 74/473 R X |
| 4,069,900 | 1/1978 | Stamate | 192/4 A |
| 4,346,618 | 8/1982 | Sakamoto et al. | 74/473 R X |
| 4,496,035 | 1/1985 | Wanie | 192/4 C |

Primary Examiner—Allan D. Herrmann

[57] ABSTRACT

In a vehicle having a hydrostatic transmission responsive to a transmission control lever to effect the speed and direction of the vehicle, a control linkage which translates a U-shift pattern motion of a gear lever to arched motion congenial to the transmission control lever includes a disk and first and second control plates pivotally mounted on a shaft. The gear lever is pivotally supported by the disk to engage either of the control plates. Upon engagement of the gear lever in either of the control plates, the gear lever can be pivoted about the shaft to displace the corresponding control plate which is in linked communication with the control lever of the hydrostatic transmission.

6 Claims, 6 Drawing Figures

U-PATTERN HYDROSTATIC TRANSMISSION CONTROL LINKAGE

BACKGROUND OF THE INVENTION

This invention relates to transmission control linkages and, more particularly, to U-shift pattern control linkages particularly suited for controlling hydrostatic transmissions.

It is known to employ a U-shift pattern for controlling the direction and transmission speed range of an off-road vehicle employing a mechanical transmission. Because of operator familiarity with the U-shift transmission lever pattern, it would be advantageous to associate the U-shift transmission lever pattern on with offroad vehicles employing a hydrostatic transmission.

SUMMARY OF THE INVENTION

It is therefore an object of the present invention to present a transmission control linkage which translates a U-shift pattern motion of a shift lever to arched motion cogenial to the control arm of a hydrostatic transmission.

The vehicle includes a console having a U-shaped slot formed in the top wall. The shift lever extends through the slot and is longitudinally confined therein. The control linkage includes a shaft pivotally mounted within the console, the shaft having a disk pivotally mounted therearound. The disk includes a yoke portion which pivotally support the transmission control lever for axially directed pivotal motion relative to the shaft.

First and second control plates are pivotally mounted in spaced-apart relationship on the shaft. Each plate has formed thereon a radially directed slotted tab and nipple. The tab and nipple of each plate are located at approximately right angles. The central plates are aligned such that in a neutral setting the slotted tabs are laterally aligned and the nipples are in opposite radial alignment. The console contained end of the far lever is laterally aligned to both tab slots. A first link is pivotally mounted at one end to the nipple of the first plate and at the other end to the control lever of the hydrostatic transmission. A second link is pivotally mounted, in like manner, to the second plate nipple and the transmission control lever.

In the neutral transmission mode, the transmission control lever is midway along its arched sweep path. By laterally shifting the shift lever to be engaged in one of the slotted tabs, subsequent radial displacement of the shift lever by drawing the shift lever in one of the slots causes the corresponding control plate to pivot. The corresponding first or second links then displaces the transmission control lever in one direction along its arch sweep path causing the transmission to respond in the corresponding directional mode. In like manner, engagement of the shift lever to the other control plate and like displacement of the shift lever in the other slot causes the transmission control lever to displace in the opposite direction along the sweep path causing the hydrostatic transmission to respond in the opposite directional mode.

DETAILED DESCRIPTION OF THE PREFERRED EMBODIMENT

Figure 1:
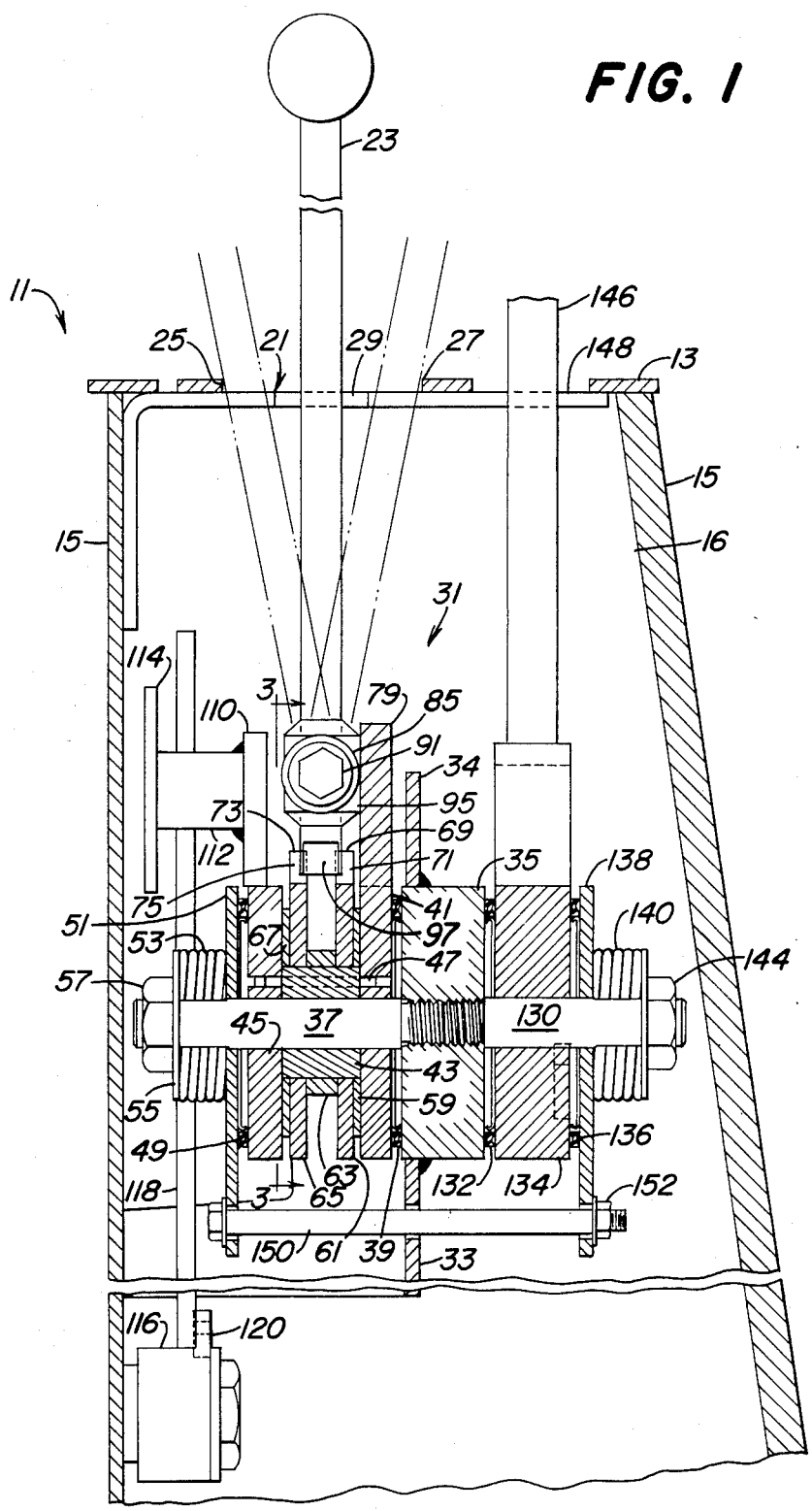
FIG. 1 is a sectional view of a vehicle control console housing a transmission control linkage in accordance with the present invention.
Figure 2:
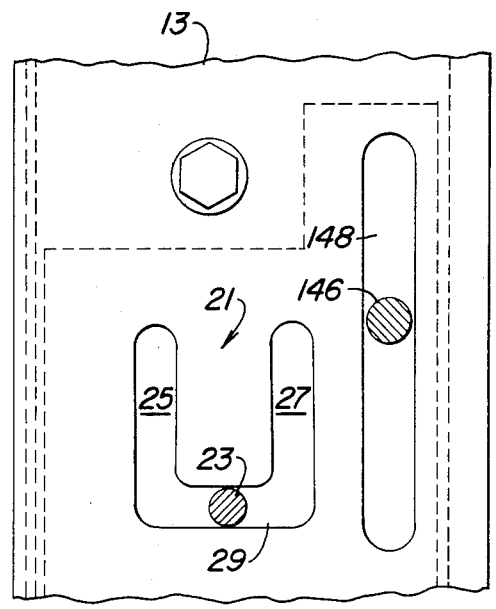
FIG. 2 is a partial top view of the console.

Referring to FIGS. 1 and 2, a console, generally indicated as 11, is mounted in the operator's station of a conventional off-road vehicle of the type employing a hydrostatic transmission system (not shown). The console 11 is comprised of a housing having a top wall 13 and enclosing sidewalls 15 and 16. A slot 21 having a generally U-shape is formed in the top wall 13. A shift lever 23 extends generally perpendicular through the slot 21.

The U-shaped slot 21 defines a first leg 25, an opposite leg 27 and intersecting leg 29. Shift lever 23 is selectively moved to leg 25 to effect a forward hydrostatic, increasing the forward speed as the shift lever 23 journeys further down leg 25. In like manner, selectively placing the shift lever 23 in leg 27 effects a reverse hydrostatic transmission mode at increased speeds upon the journey of shift lever 23 down slot 27. When the shift lever 23 is within slot 29, the hydrostatic transmission is in a neutral operating mode.

Figure 3:
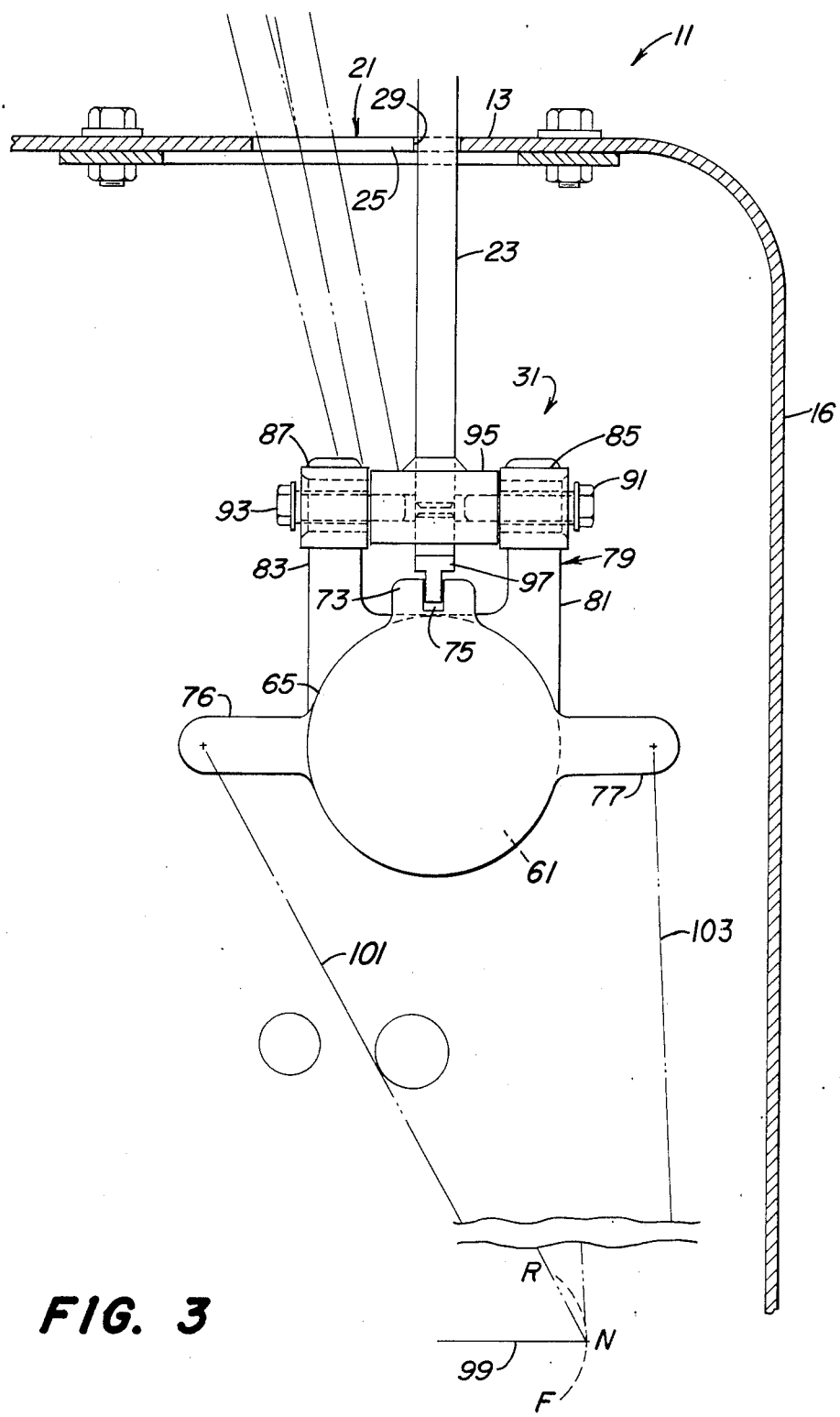
FIG. 3 is a schematic view of the engaging plates of the transmission control linkage in a neutral mode.
Figure 4B:
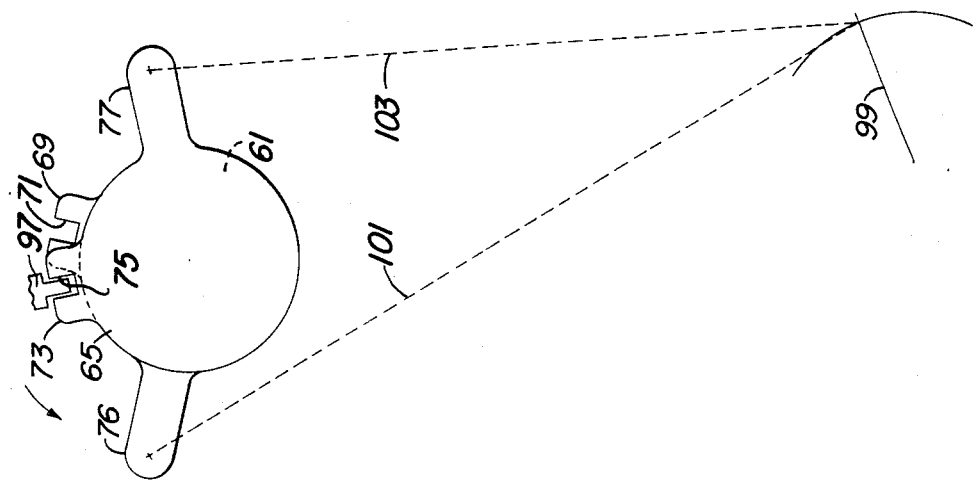
FIG. 4b is a schematic of the engaging plates of the transmission control linkage in a full reverse mode.
Figure 4A:
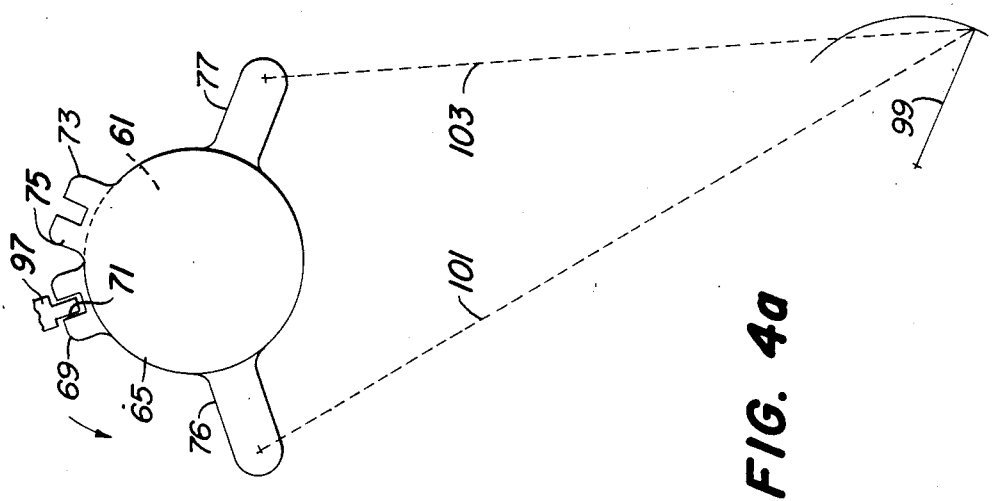
FIG. 4a is a schematic view of the engaging plates of the transmission control linkage in a full forward mode.

Referring more particularly to FIGS. 1 and 3, the vehicle's operating mode, as translated through the constituent hydrostatic transmission, is predicated upon the selective positioning of shift lever 23 acting through control linkage system 31 upon the hydrostatic transmission. The control linkage 31 includes a support bracket 33 fixably mounted to sidewall 15 by any conventional means such as welding. The bracket 33 has a vertically extending cantilevered portion 34 having a support member 35 fixably mounted therein by any conventional means such as welding. Threadably engaging the support member 35 in horizontal cantilever fashion at one end is a first shaft 37. The first shaft has rotatably mounted thereon, as viewed in FIG. 1 from right to left, a first thurster bearing 39 abutting the support member 35 on the left-hand side followed by a first disk 41. A spool 43 is then rotatably mounted around shaft 37 followed by a rotatable second disc 45. The spool 43 maintains the first and second disks 41 and 45 in spaced-apart relationship. Further, the spool 43, first disk 41 and second disk 45 contain a plurality of axially aligned holes or apertures therethrough in which reside pins 47 such that the spool 43, first disk 41 and second disk 45 pivot about shaft 37 in unison. A second thruster bearing 49, alignment plate 51 and spring 53 then follow sequentially around shaft 37. A washer 55 and threadably engaged nut 57 maintain the spring 53 in compression.

Pivotally mounted around the spool 43, noting from right to left, is a first spacer 59, a forward control plate 61, a second spacer 63, a reverse control plate 65, and a third spacer 67. The spacer 63 maintains the control plates 61 and 65 in fixed spaced-apart relationship. The control plate 61 has an appendage tab 69 formed radially thereon, the tab 69 contains an outwardly directed radial slot 71. In like manner to control plate 61, control plate 65 has a formed tab 73 containing a slot 75. The control plates 61 and 65 further include, formed respective thereon, a radially outward directed nipple 76 and 77. The nipples 76 and 77 are located at right angle to the respective tab 73 and 69 and in opposing radial directions when the transmission is in a neutral mode.

Referring particularly to FIGS. 1 and 3, direct communication between gear lever 23 and linkage 31 is provided by the first disk 41. Disk 41 includes an outward radially directed yoke portion 79 having yoke arms 81 and 83. The yoke arms 81 and 83 have fixably mounted thereon respective bosses 85 and 87. Studs 91 and 93 extend axially through respective bosses 85 and 87 to be fixably received in opposite sides of a support block 95 such that support block 95 is pivotally supported by studes 91 and 93 between bosses 85 and 87. The pivotal direction of support block 95 is at a right angle to the pivotal direction of disk 41. The gear lever 23 is fixably mounted in the support block 95 at one end by any conventional means such as by threaded engagement to extend in a radial direction relative to shaft 37. An engaging tab 97 is also received fixably mounted by any conventional means such as by threaded engagement in support block 95 radially aligned to shift lever 23. In the neutral mode, the engaging tab 97 is partially received in both control plate tab slots 71 and 75 and the gear lever 23 is positioned in leg 29 of slot 21. It is observed that, to obtain a forward engagement from neutral, the gear lever 23 can be pivoted leftward (as viewed in FIG. 1) about studs 91 and 93 causing tab 97 to be engagingly received in slot 71 of control plate 61 and, in like manner, pivoting of the control lever 23 rightwardly about studs 91 and 93 causes engagement of tab 97 in slot 75 of control plate 65.

The control plates 61 and 65 communicate with the transmission control lever 99 directly through respective link arms 101 and 103 (schematically represented in the figures). Link arm 101 is pivotally mounted at one end to nipple 76 of control plate 61 and to the transmission control lever 99 at the other end by any conventional means. In like manner, link arm 103 provides communication between nipple 77 of control plate 65 to transmission control lever 99.

Figure 5:
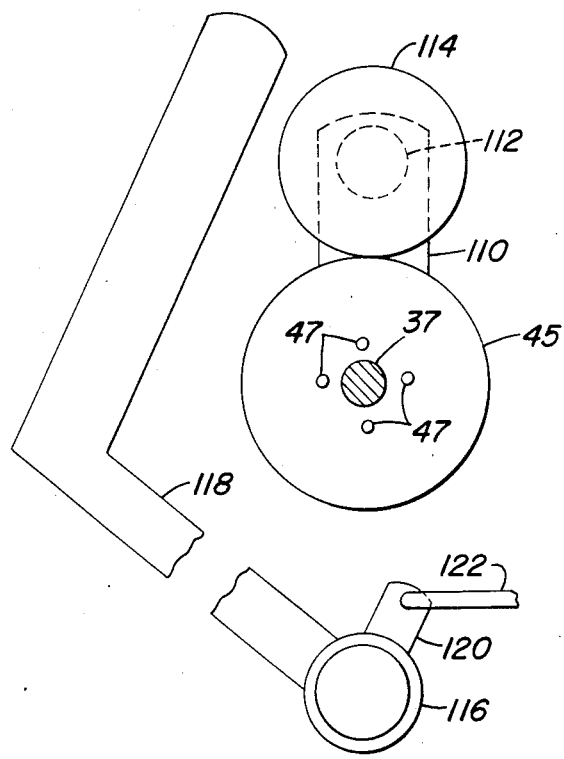
FIG. 5 is a side view of the transmission control linkage neutral return.

Referring to FIGS. 1 and 5, the linkage system 31 further includes means to interact with the vehicle's braking system such that activation of the vehicle's braking system beyond a critical level causes the vehicle's hydrostatic transmission to decrease the output power lever in either the forward or reverse mode. Full activation of the vehicle's braking system causes the vehicle's hydrostatic transmission to return to neutral. The afore means includes a tab 110 fixably mounted to disk 45 by conventional means such as welding to extend radially therefrom. A spool 112 is fixably mounted to tab 110 at one end by any conventional means such as welding. A circular disk 114 is fixably mounted to the other end of spool 112. A crank 116 is pivotally mounted to the console sidewalls 15 by any conventional means such that an arm 118 of the crank 116 extends to a position adjacent to spool 112. A second crank arm 120 is in communication with the vehicle braking system through a link 122 in any suitable manner.

Referring again to FIGS. 1 and 2, a second shaft 130 is threadably engaged in the support member 35 in cantilever fashion coaxial to shaft 37. A truster bearing 132 is placed on shaft 130 abutting support member 35 on the right-hand side followed by a conventional throttle crank 134 pivotally mounted around shaft 130. Another truster bearing 136, a second alignment plate 138 and spring 140 sequentially placed around shaft 130 followed by a washer 142 and a threadably engaged in nut 144. A throttle lever 145 extends through a slot 148 to fixably attach at one end to the throttle crank 134, the throttle crank 134 being in communication with the vehicles engine through a link (not shown) in a conventional manner.

In order to maintain proper component alignment on the shafts 37 and 130, an alignment bolt 150 is journalled through the alignment plates 51 and 138, and support bracket 33. The bolt 150 is secured therethrough by any conventional means such as by a nut 152.

OPERATION

To achieve a forward transmission operation mode, gear lever 23 is pivotally displaced to the left as viewed in FIGS. 1 and 2 within leg 29 of slot 21 about studs 91 and 93. Tab 97 is thereby engaged in slot 71 of control plate tab 69. By subsequently displacing gear lever 23 in leg 25, control plate 61 is pivoted about spool 43 in a counterclockwise direction causing nipple 76 to displace link arm 101 downwardly which in turn displaces the transmission control lever 99 in the forward mode direction. Displacement of the transmission control lever 99 also causes displacement of link arm 103 resulting in clockwise pivotal motion of control plate 65 about spool 43. In like manner, to achieve reverse operating mode, gear lever 23 is pivoted within leg 29 about studs 91 and 93 thereby causing tab 97 to be singularly engaged in slot 75 of control plate tab 73. Drawing of gear lever 23 in leg 27 of slot 24 causes control plate 65 to pivot in a counterclockwise direction. The pivoting of control plate 65 causes nipple 77 to displace link arm 103 upwardly which in turn displaces the transmission control lever 99 in the reverse mode direction. Displacement of the transmission control lever 99, acting through link arm 101 and nipple 76, causes clockwise pivotal motion of control plate 61 about spool 43.

It is noted that drawing gear lever 23 within either leg 25 or 27 of slot 21 causes disk 41 to pivot about shaft 37 which in turn pivots disk 45. Vehicle braking action beyond a critical level acting through crank arm 120 brings crank arm 118 into forcing abutting communication with spool 112 previously displaced by disk 45. The forced communication acts through disk 45, pins 47 and disk 41 to proportionally displace the gear lever 23 toward the neutral position resulting in a reduced transmission output in either the forward or reverse mode. Full vehicle braking action will result in a return to neutral.

I claim:

1. In a vehicle having a hydrostatic transmission responsive to a transmission control lever to effect the speed and direction of the vehicle, said hydrostatic transmission having operative modes in forward, neutral and reverse, a console and a transmission control linkage mounted within said console and in communication with said transmission control lever, said transmission control linkage comprising:

said console having a generally U-shaped slot formed therein including first and second spaced apart and generally parallel legs and a third leg intersecting the first and second legs;

a shaft mounted in said console;

a first control plate pivotally mounted on said shaft and having formed thereon a radially outward extending tab containing a slot and a radially outward extending nipple located generally at a right angle to said tab;

a second control plate pivotally mounted on said shaft in axially spaced apart relationship to said first control plate and having formed thereon a radially outward extending tab containing a slot and a radially outward extending nipple located generally at a right angle to said tab and opposite to said nipple of said first control plate;

a shift lever extending through said slot and having a tab form at one end;

means for pivotally supporting said shift lever for movement about an axis spaced from and normal to the axis of said shaft such that said shift lever can experience lateral pivotal motion within said third leg of said console slot to bring said shift lever tab into residency in said slot of said first control plate tab or into residency in said slot of said second control plate tab, and for pivotally supporting said shift lever for movement about the axis of said shaft such that said shift lever can experience pivotal motion in either said first leg or said second leg of said console slot to cause respective pivotal motion of said first control plate or of said second control plate;

a first linking arm pivotally mounted at one end to said nipple of said first control plate and pivotally mounted at the other end to said transmission control lever; and, a second linking arm pivotally mounted at one end to said nipple of said second control plate and pivotally mounted at the other end to said transmission control lever.

2. A transmission control linkage as claimed in claim 1 wherein said means comprises:

a first disk pivotally mounted on said shaft and having a yoke extending radially outward therefrom, said yoke having parallel extending arms with each having an apertured boss at its outer end;

a stud extending through each of said apertured bosses and into a support block for pivotally mounting said support block between said bosses;

said shift lever being fixably mounted in said support block to permit pivotal motion of said shift lever about said studs when said shift lever resides in said third leg of console slot; and about said first shaft when said shift lever resides in said first leg or said second leg of said console slot.

3. A transmission control linkage as claimed in claim 2, further comprising;

said vehicle having a vehicle braking system;

a second disk pivotally mounted on said shaft and having a radially outward extending tab formed thereon;

a spool fixably mounted to said tab of said second disk;

a crank pivotally mounted to said console and having a first arm positioned to contact said spool and a second arm;

means for providing responsive pivotal motion of said first and second disks; and means interconnecting said second crank arm and said braking system for causing said crank to pivotally displace should said vehicle braking system be activated beyond a preselected condition resulting in said first crank arm impacting said spool to pivot said shift lever towards said third leg of said console slot.

4. A transmission control linkage as claimed in claim 3, wherein said means for providing responsive pivotal motion comprises;

a second spool pivotally mounted coaxially around said first shaft between said first and second disks; and, a plurality of pins fixably mounted in and extending through said second spool and said first and second disks.

5. In a vehicle having a hydrostatic transmission responsive to a transmission control lever to effect the speed and direction of the vehicle, said hydrostatic transmission having operative modes in forward, neutral and reverse, a console and a transmission control linkage mounted within said console and in communication with said transmission control lever, said transmission control linkage comprising:

said console having a generally U-shaped slot including first and second spaced apart and generally parallel legs and a third leg intersecting said first and second legs;

a shaft fixably mounted in said console;

first and second control plates pivotally mounted on said shaft, in spaced relationship and each having formed thereon a radially outward extending tab containing a slot and a radially outward extending nipple located generally at a right angle to the respective tab, said nipples extending in generally opposite directions;

a shift lever extending through said slot and having a tab form at one end;

means for pivotally supporting said shift lever for pivotal movement about an axis spaced from and normal to the axis of said shaft such that said shift lever can experience lateral pivotal motion within said third leg of said console slot to bring said shift lever tab into residency in the slot of either said first or second control plate tab and for pivotally supporting said shift lever for movement about the axis of said first shaft such that said shift lever can experience longitudinal pivotal motion in either said first or second leg of said console slot to cause pivotal motion of the respective first or second control plate, said means including:

a first disk pivotally mounted around said first shaft and having a radially outwardly extending yoke portion pivotally carrying a support block;

said shift lever being fixably mounted to said support block to permit pivotal motion of said shift lever on said first disk when said shift lever resides in said third leg of said console slot and about said first shaft with said first disk when said shift lever resides in either said first or second leg of said console slot; and, communication means for communicating responsively movement of said first and second control plates to said transmission control lever.

6. A transmission control linkage as claimed in 5 further comprising:

a second disk pivotally mounted around said first shaft and having a radially outward extending tab formed thereon;

a spool fixably mounted to said tab of said second disk;

a crank pivotally mounted to said console, said crank having a first arm extending to be positioned to contact said spool upon movement of said first arm and a second arm;

a second spool pivotally mounted coaxially around said first shaft between said first and second disks;

a plurality of pins fixably mounted in and extending through said second spool and said first and second disks; and means coupled to said second crank arm for pivotally displacing said crank should said vehicle's braking system be activated beyond a preselected condition resulting in said first crank arm impacting said spool on said second disk tab and pivoting said shift lever towards said third leg (29) of said console slot.

* * * * *